United States Patent
Chen et al.

(10) Patent No.: US 11,972,622 B2
(45) Date of Patent: Apr. 30, 2024

(54) UPDATING OF ANNOTATED POINTS IN A DIGITAL IMAGE

(71) Applicant: Axis AB, Lund (SE)

(72) Inventors: Jiandan Chen, Lund (SE); Haiyan Xie, Lund (SE)

(73) Assignee: Axis AB, Lund (SE)

( * ) Notice: Subject to any disclaimer, the term of this patent is extended or adjusted under 35 U.S.C. 154(b) by 279 days.

(21) Appl. No.: 17/552,738

(22) Filed: Dec. 16, 2021

(65) Prior Publication Data

US 2022/0254178 A1    Aug. 11, 2022

(30) Foreign Application Priority Data

Feb. 2, 2021    (EP) .................................... 21154728

(51) Int. Cl.
*G06V 20/70*    (2022.01)
*G06T 7/246*    (2017.01)
*G06V 10/46*    (2022.01)

(52) U.S. Cl.
CPC ............. *G06V 20/70* (2022.01); *G06T 7/248* (2017.01); *G06V 10/46* (2022.01)

(58) Field of Classification Search
CPC ......... G06V 20/70; G06V 10/46; G06T 7/248
See application file for complete search history.

(56) References Cited

U.S. PATENT DOCUMENTS

| | | | |
|---|---|---|---|
| 9,646,571 B1 * | 5/2017 | Côté | ........................ G06T 7/251 |
| 10,778,916 B2 | 9/2020 | Jahagirdar | |
| 11,074,698 B2 * | 7/2021 | Shibuya | ................... G06F 18/22 |
| 2012/0294537 A1 | 11/2012 | Wallace et al. | |
| 2016/0277650 A1 | 9/2016 | Nagaraja et al. | |
| 2020/0068185 A1 | 2/2020 | Tzabari et al. | |
| 2020/0137326 A1 * | 4/2020 | Jahagirdar | ................ G06T 3/40 |
| 2020/0265231 A1 * | 8/2020 | Li | .......................... G06V 20/64 |
| 2022/0092797 A1 * | 3/2022 | Song | .................... G08G 1/0175 |
| 2023/0013877 A1 * | 1/2023 | Varadarajan | ............ G06T 7/246 |
| 2023/0068798 A1 * | 3/2023 | Etchart | ..................... G06T 7/74 |

(Continued)

OTHER PUBLICATIONS

Extended European Search Report dated Jul. 2, 2021 for European Patent Application No. 21154728.6.

(Continued)

*Primary Examiner* — Pinalben Patel
(74) *Attorney, Agent, or Firm* — Volpe Koenig (57) ABSTRACT

A method for updating a coordinate of an annotated point in a digital image due to camera movement is performed by an image processing device, which obtains a current digital image of a scene. The current digital image has been captured by a camera subsequent to movement of the camera relative the scene. The current digital image is associated with at least one annotated point. Each at least one annotated point has a respective coordinate in the current digital image. The method comprises identifying an amount of the movement by comparing position indicative information in the current digital image to position indicative information in a previous digital image of the scene. The previous digital image has been captured prior to movement of the camera. The method comprises updating the coordinate of each at least one annotated point in accordance with the identified amount of movement and a camera homography.

11 Claims, 6 Drawing Sheets

(56) References Cited

U.S. PATENT DOCUMENTS

2023/0118280 A1*  4/2023  Heidmann ............. G06V 20/64
                                                345/419
2023/0196718 A1*  6/2023  Li ........................ G06T 11/60
                                                382/203

OTHER PUBLICATIONS

S. Yonemoto, "A Video Annotation Tool Using Vision-based AR Technology," 2012 International Conference on Cyberworlds, pp. 226-230 (2012).
Ong, S. K. et al. "Tracking points using projective reconstruction for augmented reality." (2005).

* cited by examiner

Camera movement

UPDATING OF ANNOTATED POINTS IN A DIGITAL IMAGE

FIELD OF INVENTION

Embodiments presented herein relate to a method, an image processing device, a computer program, and a computer program product for updating a coordinate of an annotated point in a digital image due to camera movement.

TECHNICAL BACKGROUND

In general terms, surveillance cameras are video cameras used for the purpose of observing an area. Surveillance cameras are often connected to a recording device or a network, such as an internet protocol (IP) network. In some examples, images recorded by the surveillance cameras are monitored in real-time by a security guard or law enforcement officer. Cameras and other type of recording equipment used to be relatively expensive and required human personnel to monitor camera footage, but automated software has been developed for analysis of footage in terms of digital images captured by digital image video cameras. Such automated software can be configured for digital image analysis as well as organization of the thus captured digital video footage into a searchable database.

In some surveillance scenarios, there could be a need to capture a scene having a Field of View (FoV) including one or more regions for which privacy should be preserved. The image content of such one or more regions should thus be excluded from any recording in the video surveillance system. In some surveillance scenarios, where a surveillance zone is defined there could be a need to capture a scene having a FoV that is wider than the surveillance zone. Since only image content from inside the surveillance zone needs to be analysed, any image content outside the surveillance zone should be excluded from any analysis in the video surveillance system, (although the image content outside the surveillance zone does not need to be excluded from any recording in the video surveillance system). In respect to both these scenarios, a region of interest (ROI) can be defined as a portion of an image that is to be subjected to filtering or other type of operation. An ROI can thus be defined such that the one or more regions for which privacy should be preserved is filtered out. An ROI can be defined by a binary mask. The binary mask is of the same size as the image to be processed. In the binary mask, pixels that define the ROI are set to 1 whereas all other pixels are set to 0 (or vice versa, depending on the purpose of the binary mask; to include or exclude the image content inside the ROI).

In other surveillance scenarios, a virtual line extending between two end-points, and defining a virtual trip wire, could by the video surveillance system be added in the scene for crossline detection; an alarm, or other type of indication, is to be issued whenever an object (such as a human being, vehicle, or other type of object) crosses the virtual line in the scene.

One way to define the corner points of an ROI and/or the end-points of the virtual line is to use annotated points. Each annotated point has a coordinate which commonly is manually or semi-automatically set. However, once set, the coordinates of the annotated points might suffer from camera drifting due to vibration, camera position drift, FoV orientation shift, temperature changes, mechanical aging, and so on. This might cause the corner points of the ROI and/or the end-points of the virtual line to change, thereby affecting the location of the privacy mask, which part of the surveillance zone that is actually under surveillance, and/or the location of the virtual line. Further, when the camera is replaced, the annotated points need to be manually relabelled.

Hence, there is a need for an improved handling of annotated points when a camera is subjected to camera movement (as, for example, caused by any of: camera drifting due to vibration, camera position drift, FoV orientation shift, temperature changes, mechanical aging, camera replacement).

SUMMARY

Provided herein is a method, an image processing device, a computer program, and a computer program product for updating a coordinate of an annotated point in a digital image due to camera movement (where, as above, the camera movement is caused by any of: camera drifting due to vibration, camera position drift, FoV orientation shift, temperature changes, mechanical aging, camera replacement).

According to a first aspect, there is presented a method for updating a coordinate of an annotated point in a digital image due to camera movement. The method is performed by an image processing device. The method comprises obtaining a current digital image of a scene. The current digital image has been captured by a camera subsequent to movement of the camera relative the scene. The current digital image is associated with at least one annotated point. Each at least one annotated point has a respective coordinate in the current digital image. The method comprises identifying an amount of the movement by comparing position indicative information in the current digital image to position indicative information in a previous digital image of the scene. The previous digital image has been captured prior to movement of the camera. The method comprises updating the coordinate of each at least one annotated point in accordance with the identified amount of movement and a camera homography.

According to a second aspect there is presented an image processing device for updating a coordinate of an annotated point in a digital image due to camera movement. The image processing device comprises processing circuitry. The processing circuitry is configured to cause the image processing device to obtain a current digital image of a scene. The current digital image has been captured by a camera subsequent to movement of the camera relative the scene. The current digital image is associated with at least one annotated point. Each at least one annotated point has a respective coordinate in the current digital image. The processing circuitry is configured to cause the image processing device to identify an amount of the movement by comparing position indicative information in the current digital image to position indicative information in a previous digital image of the scene. The previous digital image has been captured prior to movement of the camera. The processing circuitry is configured to cause the image processing device to update the coordinate of each at least one annotated point in accordance with the identified amount of movement and a camera homography.

According to a third aspect there is presented a video surveillance system. The video surveillance system comprises a camera and an image processing device according to the second aspect.

According to a fourth aspect there is presented a computer program for updating a coordinate of an annotated point in a digital image due to camera movement, the computer program comprising computer program code which, when run on an image processing device, causes the image processing device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects resolve the issues noted above with respect to camera movement.

Advantageously, these aspects provide accurate updating of the coordinate of the annotated point in the digital image due to camera movement.

Advantageously, these aspects enable automatic re-location, or recalibration, of annotated points when they shift due to camera movement.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The concepts are now described, by way of example, with reference to the accompanying drawings, in which.

DETAILED DESCRIPTION

The concepts will now be described more fully hereinafter with reference to the accompanying drawings, in which certain embodiments of are shown. These concepts may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
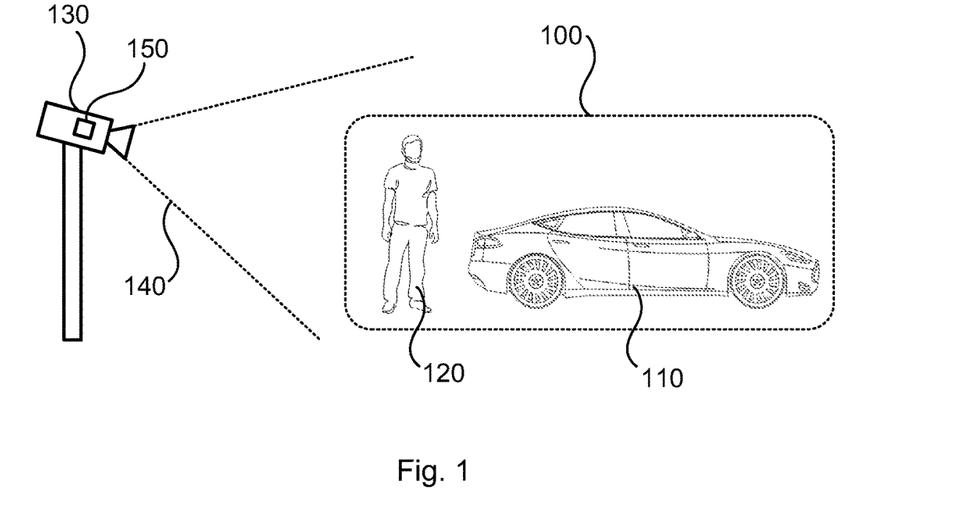
FIG. 1 is a schematic diagram illustrating a scenario according to embodiments.

FIG. 1 is a schematic diagram illustrating a scenario where embodiments presented herein can be applied. The schematic diagram of FIG. 1 represents a surveillance scenario. A camera 130 is configured to capture digital images, within a FoV 140, of a scene 100. In the illustrative example of FIG. 1 the scene 100 comprises a vehicle 110 and a person 120. The camera 130 comprises an image processing device 150. The camera 130 and the image processing device 150 might be part of a video surveillance system. Such a video surveillance system could be applied to any of the above surveillance scenarios.

As noted above there is a need for an improved handling of annotated points when a camera 130 is subjected to camera movement (as, for example, caused by any of: camera drifting due to vibration, camera position drift, FoV orientation shift, temperature changes, mechanical aging, camera replacement).

The embodiments disclosed herein therefore relate to mechanisms for updating a coordinate of an annotated point in a digital image due to camera movement. In order to obtain such mechanisms there is provided an image processing device 150, a method performed by the image processing device 150, and a computer program product comprising code, for example in the form of a computer program, that when run on an image processing device 150, causes the image processing device 150 to perform the method.

Figure 2A:
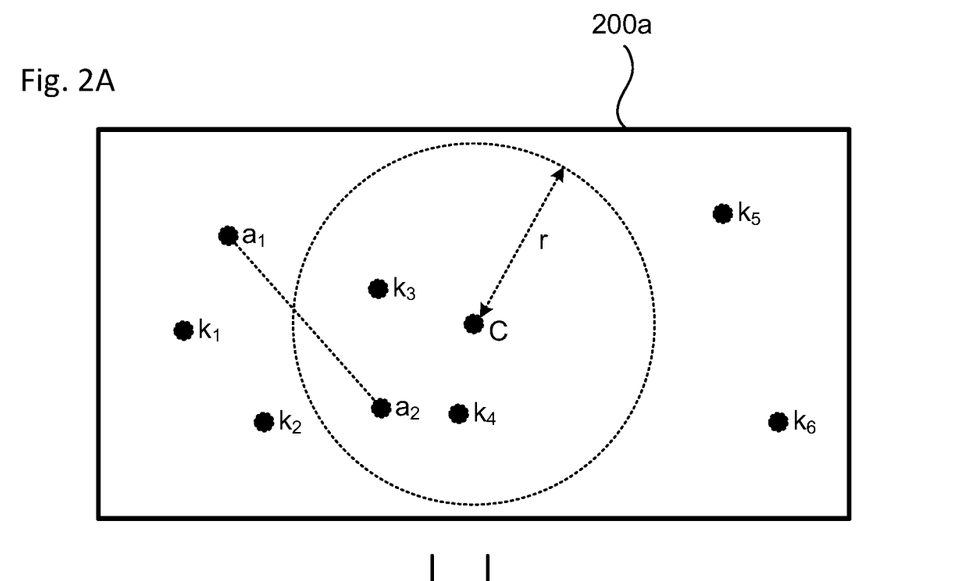
FIGS. 2A and 2B schematically illustrate annotated points and position indicative information in digital images according to an embodiment.
Figure 2B:
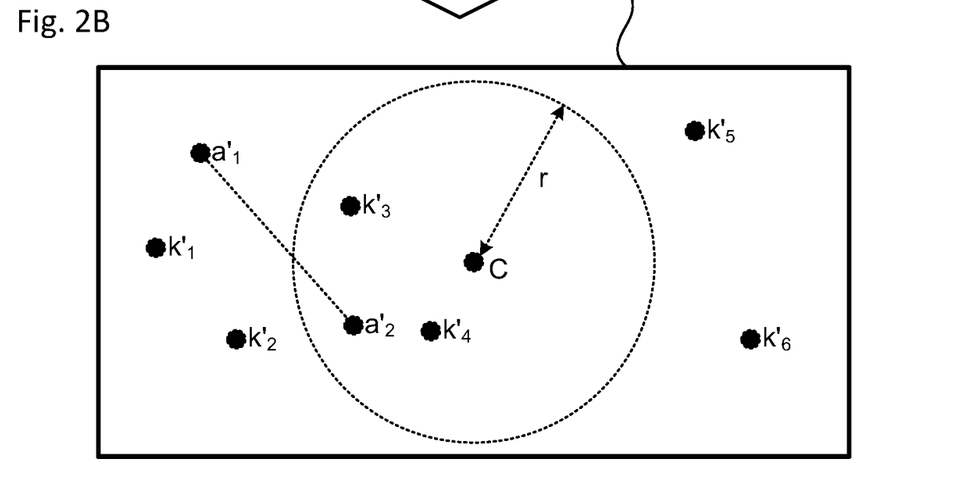

The embodiments disclosed herein enable feature-linked annotated points (of a previous digital image) to automatically calibrate the annotated points (of the current digital image) to solve the above issues relating to camera movement caused by any of camera drifting due to vibration, camera position drift, FoV orientation shift, temperature changes, mechanical aging, camera replacement. The embodiments disclosed herein are based on detecting movement of the camera 130 and updating at least one coordinate of an annotated points by comparing position indicative information of a current digital image to that of a previous digital image of the same scene 100. This will now be illustrated with reference to FIG. 2. FIG. 2A schematically illustrates annotated points $a_1$, $a_2$ as well as position indicative information in terms of key points $k_1$, $k_2$, $k_3$, $k_4$, $k_5$, $k_6$ in a previous digital image 200a. FIG. 2B schematically illustrates the same annotated points $a_1'$, $a_2'$ and key points $k_1'$, $k_2'$, $k_3'$, $k_4'$, $k_5'$, $k_6'$ as in the previous digital image 200a but in a current digital image 200b of the same scene as the previous digital image 200a. In FIG. 2 is also marked at C the image center and a radius r extending from the image center C. Possible usage of the parameters C and r will be disclosed below. It is assumed that camera movement has occurred sometime in between capturing of the previous digital image 200a and capturing of the current digital image 200b. Therefore, as can be seen by comparing FIG. 2B to FIG. 2A, the camera movement has caused the coordinates of the annotated points $a_1$, $a_2$ (as well as the coordinates of the key points $k_1$:$k_6$) to be shifted.

Figure 3:
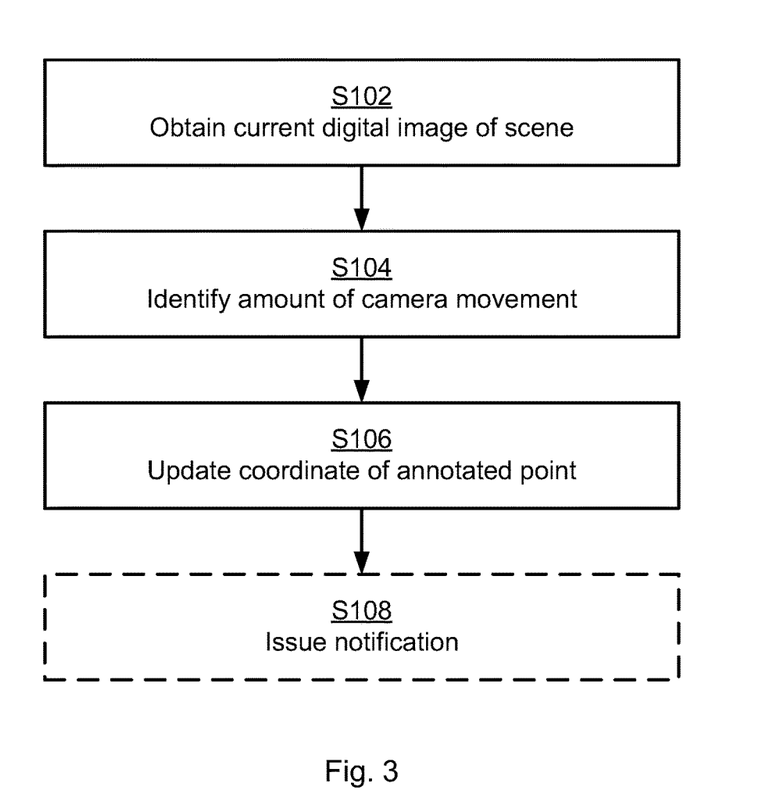
FIG. 3, FIG. 4, and FIG. 5 are flowcharts of methods according to embodiments.

FIG. 3 is a flowchart illustrating embodiments of methods for updating a coordinate of an annotated point $a_1$, $a_2$ in a digital image 200b due to camera movement. The camera movement can be due to either one and the same camera 130 having been moved so that the FoV 140 changes, or that one camera 130 is replaced by another camera 130 (which, potentially, also causes the FoV 140 to change). The methods are performed by the image processing device 150. The methods are advantageously provided as computer programs 920. In particular, the image processing device 150 is configured to perform steps S102, S104, S106:

S102: The image processing device 150 obtains a current digital image 200b of a scene 100. The current digital image 200b has been captured by the camera 130 subsequent to movement of the camera 130 relative the scene 100. The current digital image 200b is associated with at least one annotated point $a_1'$, $a_2'$. Each at least one annotated point $a_1'$, $a_2'$ has a respective coordinate in the current digital image 200b.

S104: The image processing device 150 identifies the amount of the movement by comparing position indicative information in the current digital image 200b to position indicative information in a previous digital image 200a of the scene 100. The previous digital image 200a has been captured prior to movement of the camera 130 (either by the same camera 130 or by another camera 130).

S106: The image processing device 150 updates the coordinate of each at least one annotated point (from $a_1$, $a_2$ to $a_1'$, $a_2'$) in accordance with the identified amount of movement and a camera homography (of the camera 130).

This method enables automatic re-location, or recalibration, of annotated points when they shift due to camera movement.

Embodiments relating to further details of updating a coordinate of an annotated point $a_1'$, $a_2'$ in a digital image 200b due to camera movement as performed by the image processing device 150 will now be disclosed.

There can be different examples of position indicative information. In some aspects, the position indicative information in the current digital image 200b and the previous digital image 200a is defined by a respective set of keypoints $k_1:k_6$, $k_1':k_6'$. In particular, in some embodiments, the position indicative information in the current digital image 200b is represented by a first set of keypoints $k_1':k_6'$ extracted from the current digital image 200b, and the position indicative information in the previous digital image 200a is represented by a second set of keypoints $k_1:k_6$ extracted from the previous digital image 200a.

In some aspects, it is the matching between the keypoints $k_1':k_6'$ in the current digital image 200b and the keypoints $k_1:k_6$ in the previous digital image 200a that yields the amount of camera movement. In particular, in some embodiments, the comparing involves location-wise matching of the first set of keypoints $k_1':k_6'$ to the second set of keypoints $k_1:k_6$. The amount of movement is then identified from how much the coordinates in the current digital image 200b of the first set of keypoints $k_1:k_6$ differ from the coordinates in the previous digital image 200a of the second set of keypoints $k_1:k_6$. How discriminative keypoints can be selected based on ranking their similarity will be disclosed next. In some aspects, the matching is performed by minimizing the distance between feature vectors in the current digital image 200b and feature vectors in the previous digital image 200a. In particular, in some embodiments, a respective first feature vector is determined for each keypoint $k_1:k_6$ in the first set of keypoints $k_1':k_6'$ and a respective second feature vector is determined for each keypoint $k_1:k_6$ in the second set of keypoints $k_1:k_6$. The first set of keypoints $k_1':k_6'$ is then matched to the second set of keypoints $k_1:k_6$ by finding a set of pairs of one of the first feature vectors and one of the second feature vectors that yields minimum distance between the first feature vectors and the second feature vectors among all sets of pairs of one of the first feature vectors and one of the second feature vectors.

Properties of the second set of keypoints $k_1:k_6$ will now be disclosed. In some embodiments, the second set of keypoints $k_1:k_6$ is a subset of all keypoints $k_1:k_6$ extractable from the previous digital image 200a. How selection of the most appropriate keypoints can be performed, in terms of how this subset of all keypoints $k_1:k_6$ can be determined, will now be disclosed.

In some aspects, any keypoints $k_1:k_6$ with similar pairs of feature vectors are excluded from being included in the second set of keypoints $k_1:k_6$. That is, in some embodiments, those of all keypoints $k_1:k_6$ with second feature vectors most similar to a second feature vector of another keypoint $k_1:k_6$ extracted from the previous digital image 200a are excluded from being included in the second set of keypoints $k_1:k_6$.

In some aspects, location information is used when determining which of all keypoints $k_1:k_6$ to be included in the second set of keypoints $k_1:k_6$. In particular, in some embodiments, which of all keypoints $k_1:k_6$ to be included in the second set of keypoints $k_1:k_6$ is dependent on their location in the previous digital image 200a. In this respect, as will be disclosed next, the location could be relative to the image center and/or the annotated points.

In some aspects, those of all keypoints $k_1:k_6$ located closest to the image center are candidates to be included in the second set of keypoints $k_1:k_6$. In particular, in some embodiments, the second set of keypoints $k_1:k_6$ is restricted to only include keypoints $k_1:k_6$ located within a predefined radius, denoted r in FIG. 2, from a center, denoted C in FIG. 2, of the previous digital image 200a.

In some aspects, those of all keypoints $k_1:k_6$ located closest to the annotated points $a_1$, $a_2$ are candidates to be included in the in the second set of keypoints $k_1:k_6$. In particular, in some embodiments, the previous digital image 200a is associated with at least one annotated point $a_1$, $a_2$, where each at least one annotated point $a_1$, $a_2$ has a respective coordinate in the previous digital image 200a, and the second set of keypoints $k_1:k_6$ is restricted to only include keypoints $k_1:k_6$ located within a predefined radius from the coordinate of the at least one annotated point $a_1$, $a_2$ in the previous digital image 200a.

Thereby, the above embodiments, aspects, and examples enable the most appropriate keypoints to be selected according to the coordinate of the at least one annotated point, and the image centre.

In some aspects, the previous digital image 200a is selected from a set of previous digital images 200a of the scene 100. Examples of how the previous digital image 200a can be selected from this set of previous digital images 200a of the scene 100 will now be disclosed.

In some embodiments, each of the previous digital images 200a in the set of previous digital images 200a has its own time stamp, and which previous digital image 200a to select is based on comparing the time stamps to a time stamp of the current digital image 200b. The previous digital image 200a can thus be selected based on a time stamp comparison such that the previous digital image 200a has been captured at the same time of day as the current digital image 200b, or closest in time to the current digital image 200b.

In further examples, which previous digital image 200a to select is based on illumination, image quality, etc. Also, combination of such parameters is envisioned. For example, in order to get the best image quality for optimizing the matching of the keypoints, the previous digital image 200a as well as the current digital image 200b can be extracted within a certain time interval, for example, during daytime. Further, similar time stamps could yield most similar image quality and illumination with respect to the previous digital image 200a and the current digital image 200b.

Aspects of how the coordinate of each at least one annotated point $a_1$, $a_2$ can be updated will now be disclosed. In some embodiments, the coordinate of each at least one annotated point $a_1'$, $a_2'$ is updated by application of a homography matrix to the coordinate of each at least one annotated point $a_1'$, $a_2'$ in the current digital image 200b. The homography matrix is dependent on the identified amount of movement and the camera homography.

Further aspects of further possible actions taken by the digital image processing device 150 will now be disclosed. In some examples, an alarm is triggered if the camera movement causes any annotated point $a_1'$, $a_2'$ to move out from the image. That is, in some embodiments, the digital image processing device 150 is configured to perform (optional) step S108:

S108: A notification is issued in case updating the coordinate of each at least one annotated point $a_1'$, $a_2'$ causes any of the at least one annotated point $a_1'$, $a_2'$ to have a coordinate outside the current digital image 200b.

Thereby, if a surveillance region of interest has moved out from the FoV 140, then an alarm can be triggered.

In some aspects, the herein disclosed embodiments can be described in two stages; a feature extraction stage and a calibration stage. The feature extraction stage involves the processing of the previous digital image whereas the calibration stage is applied after camera movement.

Figure 4:
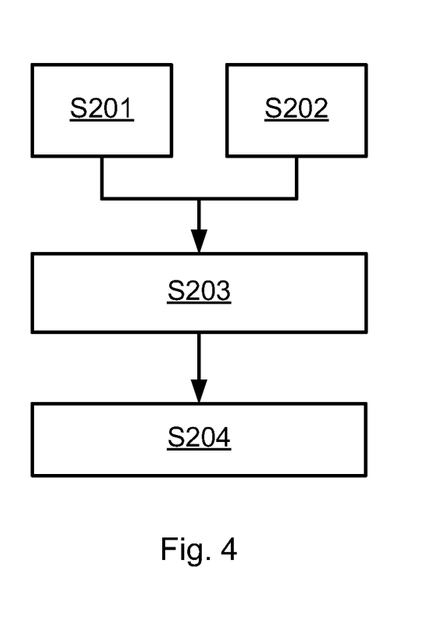

Aspects of the feature extraction stage will now be disclosed with reference to the flowchart of FIG. 4.

S201: At least one annotated point is set in the digital image.

Each such annotated point might represent a corner of an ROI or an end-point of a virtual line.

S202: Keypoints are searched for in the digital image.

The keypoints might be searched for using a keypoint detector. Non-limiting examples of keypoint detectors are a Harris corner detector, a scale-invariant feature transform (SIFT) detector, and descriptors based on convolutional neural network (CNN). The keypoint detector identifies the coordinates of each keypoint as well as an associated descriptor (or feature vector). In some non-limiting examples, the descriptor is provided as a 32 to 128 variable vector. The descriptors make each of the keypoints distinct and identifiable from the other keypoints. Without loss of generality, the total number of keypoints found is denoted K.

S203: The most appropriate keypoints (descriptors) are selected.

Step S203 might be implemented in terms of a number of sub-steps, or sub-routines.

M≤K discriminative keypoints are selected by ranking their similarity. In one example, the similarity between a pair of two keypoints is computed from the Euclidean distance between the descriptors (or feature vectors) of the two keypoints. If the Euclidean distance is smaller than a pre-set threshold distance, this pair of keypoints are defined as similar, and therefore discarded.

The M keypoints may be divided randomly into g subsets $S_g$. Each such subset consists of N keypoints from the original M keypoints, where N<<M. In some examples, at least 4 keypoints are selected, that is N≥4. The N keypoints are selected as having the minimum distances, in terms of coordinates, to the image centre and/or the annotated points, as defined by the minimization criterion in (1):

$$\min(S_1, S_2, \ldots, S_g), \quad (1)$$

where the weighted distance, $S_k$, is defined as:

$$S_k = w_k \cdot \sum_{i=1}^{N} \sum_{j=1}^{J} d(k_i, a_j) + w_c \cdot \sum_{i=1}^{N} d(k_i, C) \quad (2)$$

In (2), $d(k_i, a_j)$ is the Euclidean distance, in terms of coordinates, between each keypoint $k_i$ to each annotated point $a_j$ in the digital image, and $d(k_i, C)$ is the Euclidean distance, in terms of coordinates, between each keypoint $k_i$ to the image center C, and $w_k$ and $w_c$ are their respective weights. Further, j denotes the total number of annotated points. The weights can be used to either prioritize keypoints closer to the annotation points, or keypoints closer to the image center. The minimization criterion in (1) is used because the closer the distance, in terms of coordinates, between the keypoints and the annotation points in the digital image, the less the probability is for the keypoints to get lost, or even be moved out from the digital image, when the camera 130 is moved.

Further, the distance between each two keypoints $k_i$, $k_j$ in each subset might fulfil:

$$\sum_{i=1}^{N} \sum_{j=1}^{N} d(k_i, k_j) > D_t \quad (3)$$

The summation of distances $d(k_i, k_j)$ between each two keypoints is larger than a threshold Dt, which avoids the possibility of keypoints converging together. This can be implemented by different techniques, for example, the RANdom SAmple Consensus (RANSAC) algorithm.

For example, as illustrated in FIG. 2, keypoints $k_1$-$k_4$ have smaller distance, in terms of coordinates, to the annotated points and the image centre than keypoints $k_5$ and $k_6$, and thus keypoints $k_1$-$k_4$ are selected whilst keypoints $k_5$ and $k_6$ are discarded.

In surveillance applications, the locations of the annotated points and the image centre are usually the most important positions.

S204: The coordinates and descriptors (feature vectors) of the selected keypoints, as well as the coordinates of the annotated points, are stored.

Additionally, camera settings, e.g., the camera focal length might be stored to enable calibration, or normalization, of the camera view, etc.

Figure 5:
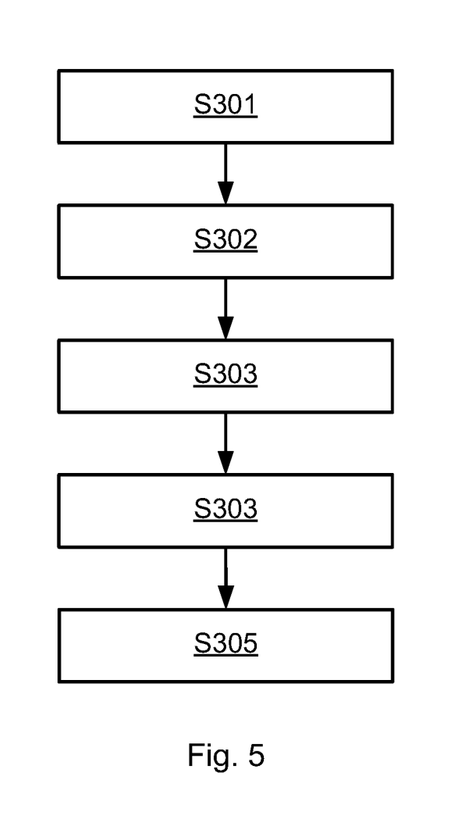

Aspects of the calibration stage (as applied after the camera 130 has been moved or replaced) will now be disclosed with reference to the flowchart of FIG. 5.

S301: The coordinates of the annotated points and the keypoints (with their coordinates and descriptors) of a previous digital image of the same scene are obtained.

S302: Keypoints in the current image are identified. How to identify the keypoints in the current image has been disclosed above with reference to the description of FIG. 3.

S303: Matching keypoints are identified using feature vectors determined from the keypoints $k_1'$:$k_6'$ in the current digital image 200b and the keypoints $k_1$:$k_6$, in the previous digital image 200a.

S304: The homography matrix is determined from the matching keypoints.

In this respect, the homography matrix is applied in order to account for camera movement, in terms of camera rotation and/or translation, between the previous digital image and the current digital image. The digital images are assumed to be normalized with respect to each other. Normalization can be achieved using information of the camera focal length used when the previous digital image was captured, and the camera focal length used when the current digital image was captured. In some non-limiting examples, the homography matrix H is computed from the matched annotated points by using Single Value Decomposition (SVD). Further aspects of how the homography matrix can be determined will be disclosed below.

S305: The homography matrix is applied to the at least one annotated point in the current digital image.

The updated coordinates, denoted A', of the at least one annotated point in the current digital image is then determined from the coordinates, denoted A, of the corresponding at least one annotated point in the previous digital image according to:

$$A' = H \cdot A \quad (4)$$

where H denotes the homography matrix.

Further aspects of how the homography matrix H can be determined will now be disclosed.

Assume, without loss of generality, that there are four pairs of corresponding annotated points. Denote by $a_1$, $a_2$, $a_3$, $a_4$ the annotated points in the previous digital image and denote by $a_1'$, $a_2'$, $a_3'$, $a_4'$ the annotated points in the current digital image. Each annotated point has a respective x-coordinate and a respective y-coordinate. Assume further that the focal length is normalized with respect to the previous digital image and the current digital image. The homography matrix H can then be computed as follows:

First, determine the following 2-by-9 matrices:

$$a_i = \begin{bmatrix} -x_i & -y_i & -1 & 0 & 0 & 0 & x_i x_i' & y_i x_i' & x_i' \\ 0 & 0 & 0 & -x_i & -y_i & -1 & x_i y_i' & y_i y_i' & y_i' \end{bmatrix} \quad (5)$$

where the indices i=1, 2, 3, 4 correspond to the four annotated points. Then stack all these 2-by-9 matrices into one matrix P, which fulfils:

$$P \cdot h = 0 \quad (6)$$

Expression (6) is thus equivalent to:

$$P \cdot h = \begin{bmatrix} -x_1 & -y_1 & -1 & 0 & 0 & 0 & x_1 x_1' & y_1 x_1' & x_1' \\ 0 & 0 & 0 & -x_1 & -y_1 & -1 & x_1 y_1' & y_1 y_1' & y_1' \\ -x_2 & -y_2 & -1 & 0 & 0 & 0 & x_2 x_2' & y_2 x_2' & x_2' \\ 0 & 0 & 0 & -x_2 & -y_2 & -1 & x_2 y_2' & y_2 y_2' & y_2' \\ -x_3 & -y_3 & -1 & 0 & 0 & 0 & x_3 x_3' & y_3 x_3' & x_3' \\ 0 & 0 & 0 & -x_3 & -y_3 & -1 & x_3 y_3' & y_3 y_3' & y_3' \\ -x_4 & -y_4 & -1 & 0 & 0 & 0 & x_4 x_4' & y_4 x_4' & x_4' \\ 0 & 0 & 0 & -x_4 & -y_4 & -1 & x_4 y_4' & y_4 y_4' & y_4' \end{bmatrix} \cdot \begin{bmatrix} h_1 \\ h_2 \\ h_3 \\ h_4 \\ h_5 \\ h_6 \\ h_7 \\ h_8 \\ h_9 \end{bmatrix} = 0$$

Assume further that the matrix P has an SVD decomposition as follows:

$$P = U \Sigma V^T$$

where the columns of V correspond to the eigenvectors of $P^T P$ and yield a solution of h. The homography matrix H can be reshaped from h. In order to improve homography matrix H, by minimizing the estimation error, a cost function could be applied. By knowing the homography matrix H, the projected coordinates of the point a(x,y) from the previous digital image to the point a'(x, y) from the current digital image is thus given by:

$$a' = H \cdot a$$

That is:

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \cdot \begin{bmatrix} x \\ y \\ 1 \end{bmatrix} \quad (7)$$

The coordinates for annotated point $p_i'$ can thus be found by inserting $x=x_i$, $y=y_i$, $x'=x_i'$, and $y'=y_i'$ in the expression (7) for i=1, 2, 3, 4.

Figure 6A:
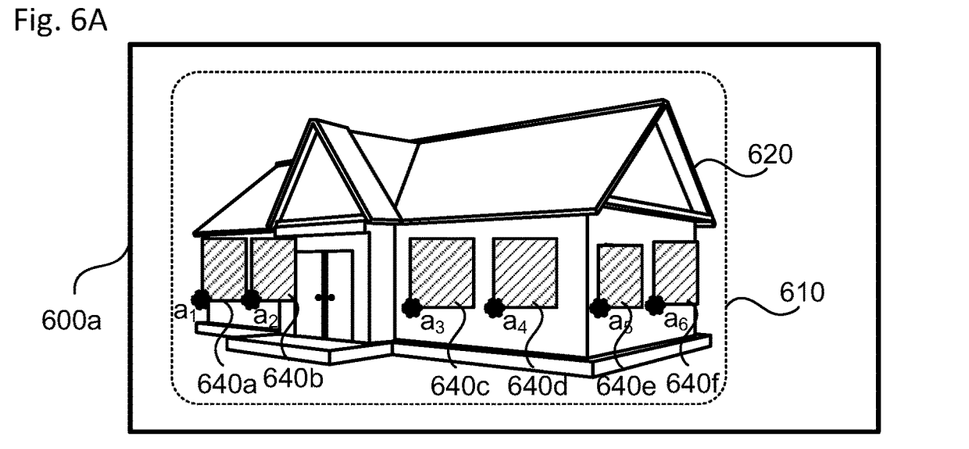
FIGS. 6A-6C and FIGS. 7A-7C schematically illustrate example scenarios according to embodiments.
Figure 6B:
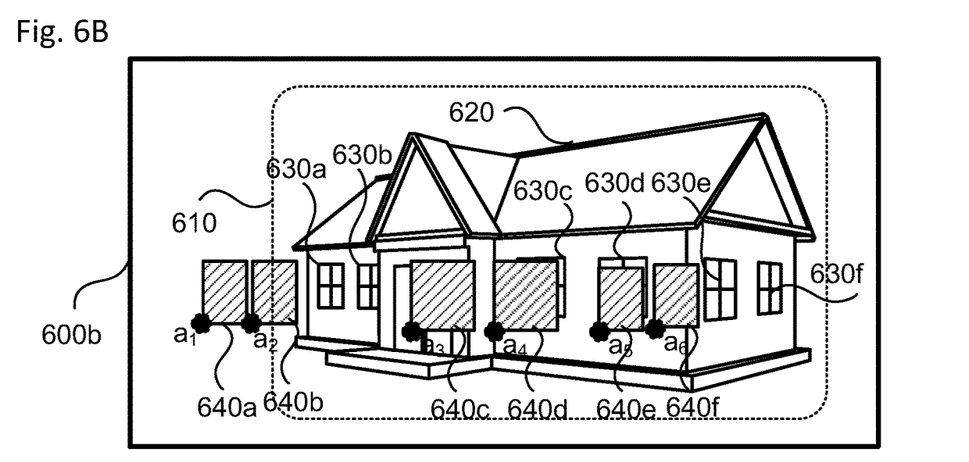
Figure 6C:
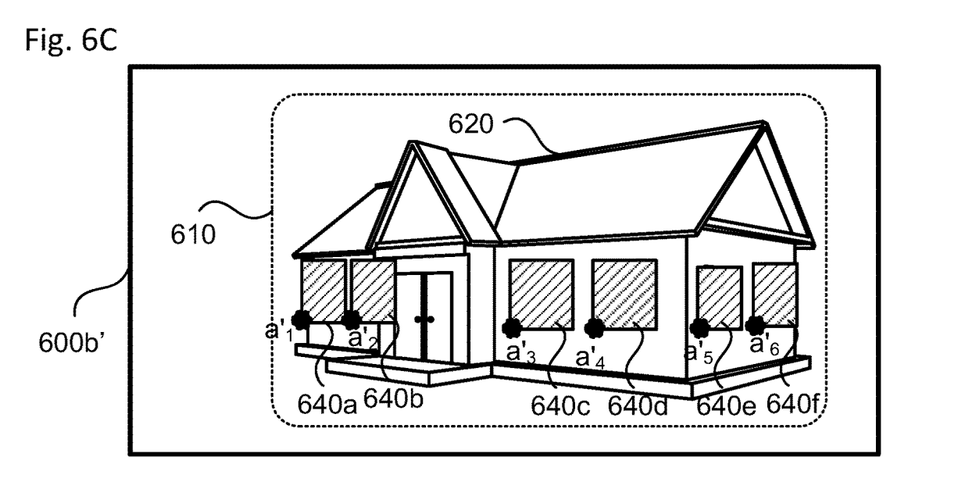

FIGS. 6A-6C schematically illustrate a first scenario where the herein disclosed embodiments can be applied. FIG. 6A illustrates a previous digital image 600a of a scene 610 as captured by a camera 130 of a video surveillance system. The scene comprises a building 620. For privacy reasons, the windows 630a:630f (not shown in FIG. 6A) of the building are to be excluded from the surveillance. Six different privacy masks 640a:640f, each covering a window 630a-630f, are therefore applied. The lower-left corners of the privacy masks are defined by annotated points $a_1:a_6$. FIG. 6B illustrates a current digital image 600b of the scene as captured by the camera 130 after camera movement. As noted at FIG. 6B, since the annotated points $a_1:a_6$ have the same coordinates as in the previous digital image 600a, the camera movement causes the privacy masks to be moved, thus partly revealing the windows 630a:630f. FIG. 6C illustrates the current digital image 600b' of the scene as captured by the camera 130 after camera movement upon application of at least some of the herein disclosed embodiments for updating the coordinates of the annotated points $a_1':a_6'$ in the current digital image due to the camera movement. As can be seen, the updating causes the privacy masks to be moved back to their correct positions, thus again properly covering the windows 630a-630f.

Figure 7A:
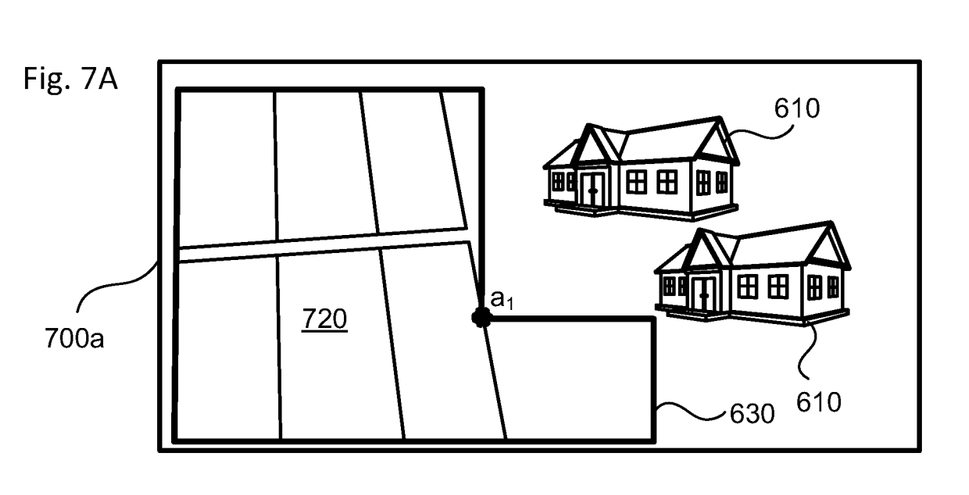
Figure 7B:
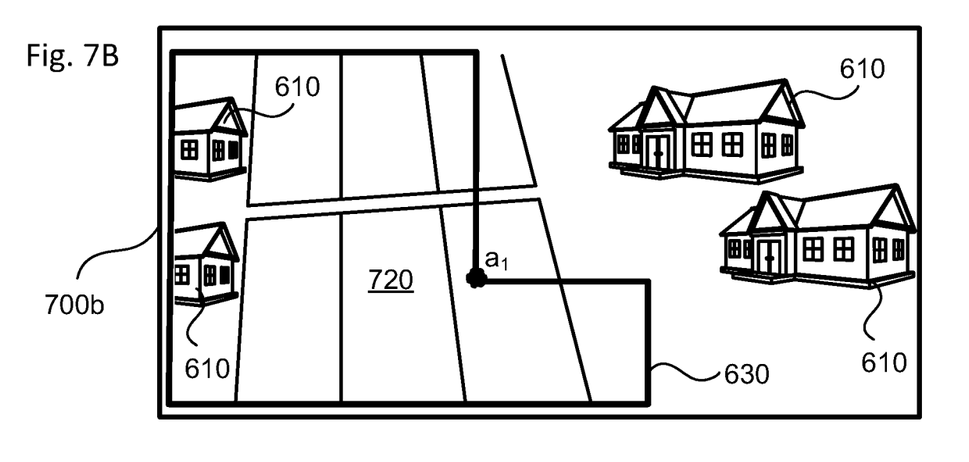
Figure 7C:
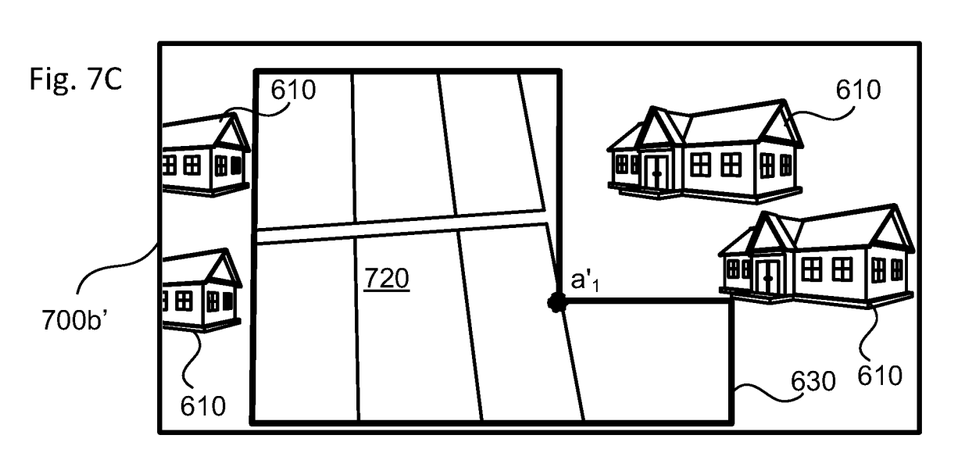

FIGS. 7A-7C schematically illustrates a second scenario where the herein disclosed embodiments can be applied. FIG. 7A illustrates a previous digital image 700a of a scene as captured by a camera 130 of a video surveillance system. The scene comprises buildings 710 and a parking lot 720. The parking lot defines a ROI 730 and is under surveillance. An ROI is therefore defined based on the corners of the parking lot. The corners of the ROI are defined by annotated points (represented by the single annotated point $a_1$). FIG. 7B illustrates a current digital image 700b of the scene as captured by the camera 130 after camera movement. As noted at FIG. 7B, since the annotated points (again represented by the single annotated point $a_1$) have the same coordinates as in the previous digital image 700a, the camera movement causes the ROI 730 to be moved, thus partly excluding some parts of the parking lot 720 from surveillance. FIG. 7C illustrates the current digital image 700b' of the scene as captured by the camera 130 after camera movement upon application of at least some of the herein disclosed embodiments for updating the coordinates of the annotated points (represented by the single annotated point $a_1'$) in the current digital image due to the camera movement. As can be seen, the updating causes the ROI 730 to be moved back to its correct position, thus again properly covering the parking lot 720.

Figure 8:
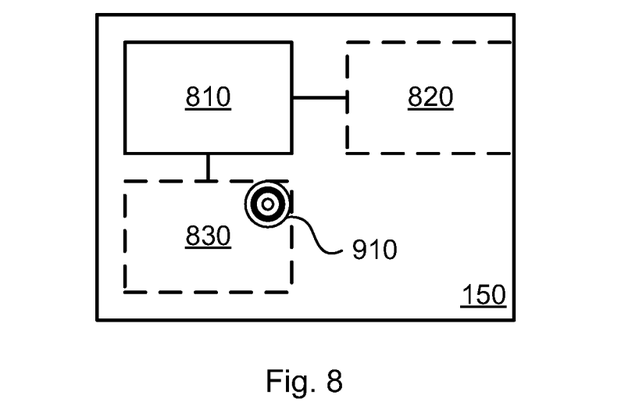
FIG. 8 is a schematic diagram showing functional units of an image processing device according to an embodiment.

FIG. 8 schematically illustrates, in terms of a number of functional units, the components of an image processing device 150 according to an embodiment. Processing circuitry 810 is provided using any combination of one or more of a suitable central processing unit (CPU), multiprocessor, microcontroller, digital signal processor (DSP), etc., capable of executing software instructions stored in a computer program product 910 (as in FIG. 9), e.g., in the form of a storage medium 830. The processing circuitry 810 may further be provided as at least one application specific integrated circuit (ASIC), or field programmable gate array (FPGA).

Particularly, the processing circuitry 810 is configured to cause the image processing device 150 to perform a set of operations, or steps, as disclosed above. For example, the storage medium 830 may store the set of operations, and the processing circuitry 810 may be configured to retrieve the set of operations from the storage medium 830 to cause the image processing device 150 to perform the set of operations. The set of operations may be provided as a set of executable instructions.

Thus, the processing circuitry 810 is thereby arranged to execute methods as herein disclosed. The storage medium 830 may also comprise persistent storage, which, for example, can be any single one or combination of magnetic memory, optical memory, solid state memory or even remotely mounted memory. The image processing device 150 may further comprise a communications interface 820 at least configured for communications with the camera 130, potentially with other functions, nodes, entities and/or devices, such as functions, nodes, entities and/or devices of a video surveillance system. As such the communications interface 820 may comprise one or more transmitters and receivers, comprising analogue and digital components. The processing circuitry 810 controls the general operation of the image processing device 150, e.g., by sending data and control signals to the communications interface 820 and the storage medium 830, by receiving data and reports from the communications interface 820, and by retrieving data and instructions from the storage medium 830. Other components, as well as the related functionality, of the image processing device 150 are omitted in order not to obscure the concepts presented herein.

The image processing device 150 may be provided as a standalone device or as a part of at least one further device. For example, the image processing device 150 and the camera 130 might be part of a video surveillance system.

A first portion of the instructions performed by the image processing device 150 may be executed in a first device, and a second portion of the of the instructions performed by the image processing device 150 may be executed in a second device; the herein disclosed embodiments are not limited to any particular number of devices on which the instructions performed by the image processing device 150 may be executed. Hence, the methods according to the herein disclosed embodiments are suitable to be performed by an image processing device 150 residing in a cloud computational environment.

Therefore, although a single processing circuitry 810 is illustrated in FIG. 8 the processing circuitry 810 may be distributed among a plurality of devices, or nodes. The same applies to the computer program 920 of FIG. 9.

Figure 9:
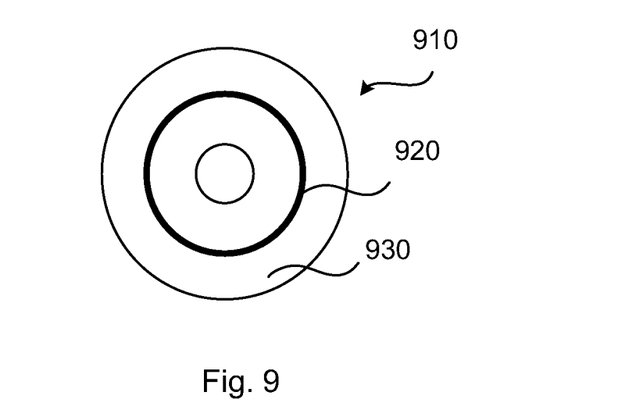
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 810 and thereto operatively coupled entities and devices, such as the communications interface 820 and the storage medium 830, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The concepts introduced herein have mainly been described above with reference to a few embodiments. However, as is readily appreciated by a person skilled in the art, other embodiments than the ones disclosed above are equally possible within the scope of the concepts, as defined by the appended patent claims.

The invention claimed is:

1. A method for updating a coordinate of an annotated point in a digital image due to unintentional camera movement, the method being performed by an image processing device, the method comprising:
obtaining a current digital image of a scene, the current digital image having been captured by a stationary mounted camera subsequent to unintentional movement of the camera relative the scene, wherein the current digital image is associated with at least one annotated point, and wherein each at least one annotated point has a respective coordinate in the current digital image, wherein there are at least two annotated points, and wherein the at least two annotated points define a border of any of: a privacy mask in the current digital image, a virtual trip wire in the scene, a surveillance zone in the scene;
identifying an amount of the unintentional movement by comparing position indicative information in the current digital image to position indicative information in a previous digital image of the scene, the previous digital image having been captured prior to unintentional movement of the camera, wherein the position indicative information in the current digital image is represented by a first set of keypoints extracted from the current digital image, wherein the position indicative information in the previous digital image is represented by a second set of keypoints extracted from the previous digital image, wherein the second set of keypoints is a subset of all keypoints extractable from the previous digital image, wherein the previous digital image is associated with at least one annotated point having a respective coordinate in the previous digital image, and wherein the second set of keypoints is restricted to only include keypoints located within a predefined radius from the coordinate of the at least one annotated point in the previous digital image; and
updating the coordinate of each at least one annotated point in accordance with the identified amount of the unintentional movement and a camera homography.

2. The method according to claim 1, wherein the comparing involves location-wise matching of the first set of keypoints to the second set of keypoints, and wherein the amount of the unintentional movement is identified from how much coordinates in the current digital image of the keypoints of the first set of keypoints differ from coordinates in the previous digital image of the keypoints of the second set of keypoints.

3. The method according to claim 1, wherein a respective first feature vector is determined for each keypoint in the first set of keypoints and a respective second feature vector is determined for each keypoint in the second set of keypoints, and wherein the first set of keypoints is matched to the second set of keypoints by finding a set of pairs of one of the first feature vectors and one of the second feature vectors that yields minimum distance between the first feature vectors and the second feature vectors among all sets of pairs of one of the first feature vectors and one of the second feature vectors.

4. The method according to claim 1, wherein those of all keypoints with second feature vectors most similar to a second feature vector of another keypoint extracted from the previous digital image are excluded from being included in the second set of keypoints.

5. The method according to claim 1, wherein which of all keypoints to be included in the second set of keypoints is dependent on their location in the previous digital image.

6. The method according to claim 1, wherein the second set of keypoints is restricted to only include keypoints located within a predefined radius from a center of the previous digital image.

7. The method according to claim 1, wherein the previous digital image is selected from a set of previous digital images of the scene, wherein each of the previous digital images in the set of previous digital images has its own time stamp, and wherein which previous digital image to select is based on comparing the time stamps to a time stamp of the current digital image.

8. The method according to claim 1, wherein the coordinate of each at least one annotated point is updated by application of a homography matrix to the coordinate of each at least one annotated point in the current digital image, and wherein the homography matrix is dependent on the identified amount of the unintentional movement and the camera homography.

9. The method according to claim 1, wherein the method further comprises:
issuing a notification in case updating the coordinate of each at least one annotated point causes any of the at least one annotated point to have a coordinate outside the current digital image.

10. An image processing device for updating a coordinate of an annotated point in a digital image due to unintentional camera movement, the image processing device comprising processing circuitry, the processing circuitry being configured to cause the image processing device to:
obtain a current digital image of a scene, the current digital image having been captured by a stationary mounted camera subsequent to unintentional movement of the camera relative the scene, wherein the current digital image is associated with at least one annotated point, and wherein each at least one annotated point has a respective coordinate in the current digital image, wherein there are at least two annotated points, and wherein the at least two annotated points define a border of any of: a privacy mask in the current digital image, a virtual trip wire in the scene, a surveillance zone in the scene;
identify an amount of the unintentional movement by comparing position indicative information in the current digital image to position indicative information in a previous digital image of the scene, the previous digital image having been captured prior to unintentional movement of the camera, wherein the position indicative information in the current digital image is represented by a first set of keypoints extracted from the current digital image, wherein the position indicative information in the previous digital image is represented by a second set of keypoints extracted from the previous digital image, wherein the second set of keypoints is a subset of all keypoints extractable from the previous digital image, wherein the previous digital image is associated with at least one annotated point having a respective coordinate in the previous digital image, and wherein the second set of keypoints is restricted to only include keypoints located within a predefined radius from the coordinate of the at least one annotated point in the previous digital image; and
update the coordinate of each at least one annotated point in accordance with the identified amount of the unintentional movement and a camera homography.

11. A non-transitory computer readable recording medium comprising a computer program for updating a coordinate of an annotated point in a digital image due to unintentional camera movement, the computer program comprising computer code which, when run on processing circuitry of an image processing device, causes the image processing device to:
obtain a current digital image of a scene, the current digital image having been captured by a stationary mounted camera subsequent to unintentional movement of the camera relative the scene, wherein the current digital image is associated with at least one annotated point, and wherein each at least one annotated point has a respective coordinate in the current digital image, wherein there are at least two annotated points, and wherein the at least two annotated points define a border of any of: a privacy mask in the current digital image, a virtual trip wire in the scene, a surveillance zone in the scene;
identify an amount of the unintentional movement by comparing position indicative information in the current digital image to position indicative information in a previous digital image of the scene, the previous digital image having been captured prior to unintentional movement of the camera, wherein the position indicative information in the current digital image is represented by a first set of keypoints extracted from the current digital image, wherein the position indicative information in the previous digital image is represented by a second set of keypoints extracted from the previous digital image, wherein the second set of keypoints is a subset of all keypoints extractable from the previous digital image, wherein the previous digital image is associated with at least one annotated point having a respective coordinate in the previous digital image, and wherein the second set of keypoints is restricted to only include keypoints located within a predefined radius from the coordinate of the at least one annotated point in the previous digital image; and
update the coordinate of each at least one annotated point in accordance with the identified amount of the unintentional movement and a camera homography.

* * * * *